United States Patent
Tamura et al.

(10) Patent No.: US 12,030,804 B2
(45) Date of Patent: Jul. 9, 2024

(54) OPTICAL FIBER

(71) Applicant: SUMITOMO ELECTRIC INDUSTRIES, LTD., Osaka (JP)

(72) Inventors: Yoshiaki Tamura, Osaka (JP); Hirotaka Sakuma, Osaka (JP); Akiko Funakoshi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 737 days.

(21) Appl. No.: 17/156,862

(22) Filed: Jan. 25, 2021

(65) Prior Publication Data

US 2021/0171390 A1   Jun. 10, 2021

Related U.S. Application Data

(63) Continuation of application No. PCT/JP2019/029691, filed on Jul. 29, 2019.

(30) Foreign Application Priority Data

Jul. 31, 2018   (JP) ................... 2018-143933

(51) Int. Cl.
  *G02B 6/38*  (2006.01)
  *C03C 13/04* (2006.01)
  *G02B 6/02*  (2006.01)

(52) U.S. Cl.
  CPC ........... *C03C 13/046* (2013.01); *G02B 6/02* (2013.01)

(58) Field of Classification Search
  CPC .................................. C03C 16/046
  USPC .......................................... 385/123
  See application file for complete search history.

(56) References Cited

U.S. PATENT DOCUMENTS

| | | | | |
|---|---|---|---|---|
| 10,151,873 B2 * | 12/2018 | Zhu | ............... | G02B 6/02028 |
| 10,185,084 B2 * | 1/2019 | Butler | ............... | C03B 19/1469 |
| 10,550,030 B2 * | 2/2020 | Sakuma | ............... | C03B 37/01815 |
| 11,067,744 B2 * | 7/2021 | Bickham | ............... | G02B 6/0288 |
| 2006/0130530 A1 | 6/2006 | Anderson et al. | | |
| 2013/0129291 A1 | 5/2013 | Hoshino et al. | | |
| 2014/0254997 A1 | 9/2014 | Tamura et al. | | |
| 2015/0241629 A1 | 8/2015 | Tamura et al. | | |
| 2016/0318793 A1 * | 11/2016 | Tamura | ............... | C03C 13/046 |

(Continued)

FOREIGN PATENT DOCUMENTS

| | | |
|---|---|---|
| EP | 3421435 A1 | 1/2019 |
| JP | 2005-537210 A | 12/2005 |
| JP | 2007-504080 A | 3/2007 |

(Continued)

*Primary Examiner* — Kaveh C Kianni
(74) *Attorney, Agent, or Firm* — Faegre Drinker Biddle Reath LLP

(57) ABSTRACT

An optical fiber includes a core, and a cladding. When a refractive index of silica glass is set as $n_0$, a refractive index of the core is set as $n_1$, and a refractive index of the cladding is set as $n_2$, a relative refractive index difference $\Delta$ defined by Expression (1):

$$\Delta[\%]=100\times(n_1^2-n_2^2)/2n_0^2 \quad (1)$$

is 0.2% or higher. A ratio of a maximum value of a concentration of the dopant composed of the alkali metal element or the alkaline-earth metal element in the cladding to a maximum value of a concentration of the dopant composed of the alkali metal element or the alkaline-earth metal element in the core is 0.06 or higher and 0.25 or lower.

8 Claims, 8 Drawing Sheets

(56) References Cited

U.S. PATENT DOCUMENTS

2017/0371096 A1\* 12/2017 Sakuma ............ C03B 37/01453
2019/0154911 A1\* 5/2019 Bookbinder ....... G02B 6/03627

FOREIGN PATENT DOCUMENTS

| JP | 2008-536190 A | 9/2008 |
| JP | 2012-086999 A | 5/2012 |
| JP | 2013-107792 A | 6/2013 |
| JP | 2013-109350 A | 6/2013 |
| JP | 2015-157726 A | 9/2015 |
| JP | 2016-210632 A | 12/2016 |
| WO | WO-2004/020357 A2 | 3/2004 |
| WO | WO-2005/021455 A2 | 3/2005 |
| WO | WO-2006/112918 A1 | 10/2006 |
| WO | WO-2017/145834 A1 | 8/2017 |

\* cited by examiner

OPTICAL FIBER

CROSS-REFERENCE TO RELATED APPLICATIONS

This is a continuation application of PCT/JP2019/029691 claiming the benefit of priority of the Japanese Patent Application No. 2018-143933 filed on Jul. 31, 2018, the entire contents of which are incorporated herein by reference.

TECHNICAL FIELD

The present disclosure relates to an optical fiber.

BACKGROUND ART

There is known an optical fiber which includes a core formed from silica glass that substantially does not contain Ge and contains alkali metal element, and a cladding formed from silica glass containing fluorine, and in which a transmission loss is low (for example, refer to Patent Literature 1 and Patent Literature 2). In the optical fiber, since the core contains the alkali metal element, viscosity of the core is reduced. According to this, it is considered that a molecular structure of core glass in a drawing process becomes uniform, and thus the transmission loss is reduced.

CITATION LIST

Patent Literature

Patent Literature 1: Japanese Unexamined Patent Publication No. 2015-157726
Patent Literature 2: Japanese Unexamined Patent Publication No. 2013-107792
Patent Literature 3: Japanese Unexamined Patent Publication No. 2005-537210
Patent Literature 4: US Unexamined Patent Publication No. 2006/0130530

SUMMARY OF INVENTION

An optical fiber according to an aspect of the present disclosure includes a core, and a cladding that surrounds the core. The core and cladding are respectively formed from silica glass containing a dopant composed of an alkali metal element or an alkaline-earth metal element. A relative refractive index difference $\Delta$ defined by Expression (1):

$$\Delta[\%] = 100 \times (n_1^2 - n_2^2)/2n_0^2 \quad (1)$$

is 0.2% or higher, where $n_0$ denotes a refractive index of silica glass that does not contain the dopant, $n_1$ denotes a refractive index of the core, and $n_2$ denotes a refractive index of the cladding. A ratio of a maximum value of a concentration of the dopant composed of the alkali metal element or the alkaline-earth metal element in the cladding to a maximum value of a concentration of the dopant composed of the alkali metal element or the alkaline-earth metal element in the core is 0.06 or higher and 0.25 or lower.

DESCRIPTION OF EMBODIMENTS

Figure 1:
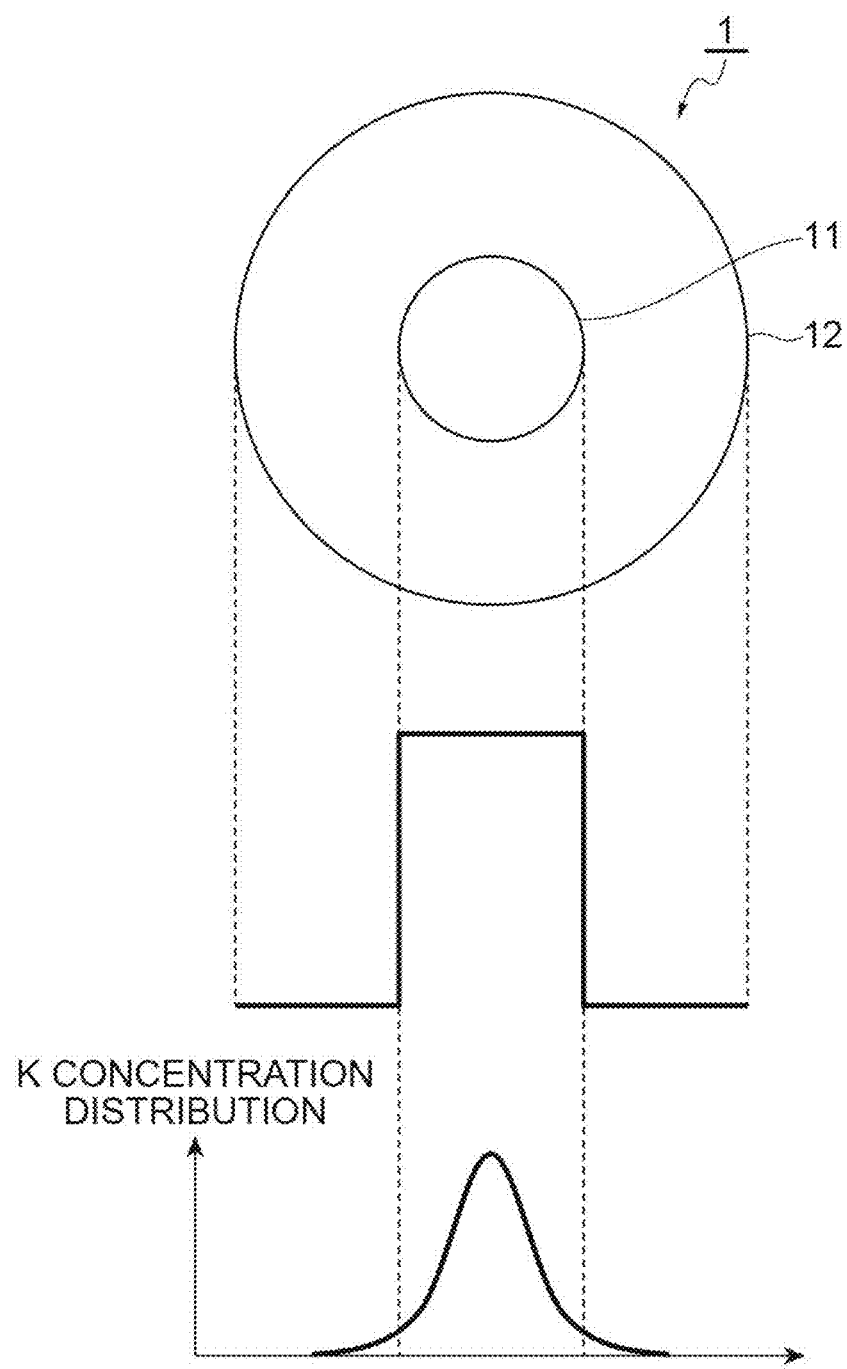
FIG. 1 is a view illustrating a cross-section of an optical fiber, a refractive index distribution, and a concentration distribution of a dopant composed of an alkali metal element or an alkaline-earth metal element according to an embodiment.

Problem to Be Solved by Present Disclosure

In the optical fiber, it is considered that the higher the concentration of the alkali metal element in the core is, the more a molecular structure of core glass becomes uniform and the further a transmission loss is reduced. However, during an examination, it has been found that even though the concentration of the alkali metal element in the core is made high, the transmission loss is not reduced in some cases.

Here, an object of the present disclosure is to provide an optical fiber capable of reducing the transmission loss.

Effects of Present Disclosure

According to the present disclosure, an optical fiber capable of reducing the transmission loss can be provided.

Description of Embodiment of Present Disclosure

First, an embodiment of the present disclosure will be listed and described. The optical fiber according to the embodiment includes a core, and a cladding that surrounds the core. The core and cladding are respectively formed from silica glass containing a dopant composed of an alkali metal element or an alkaline-earth metal element. A relative refractive index difference $\Delta$ defined by Expression (1):

$$\Delta[\%] = 100 \times (n_1^2 - n_2^2)/2n_0^2 \quad (1)$$

is 0.2% or higher, where $n_0$ denotes a refractive index of silica glass that does not contain the dopant, $n_1$ denotes a refractive index of the core, and $n_2$ denotes a refractive index of the cladding. A ratio of a maximum value of a concentration of the dopant composed of the alkali metal element or the alkaline-earth metal element in the cladding to a maximum value of a concentration of the dopant composed of the alkali metal element or the alkaline-earth metal element in the core is 0.06 or higher and 0.25 or lower. Hereinafter, the "dopant composed of the alkali metal element or the alkaline-earth metal element" is referred to as "alkali metal element or the like".

In the optical fiber according to the embodiment, since a relative refractive index difference Δ is 0.2% or higher, light is allowed to propagate over a long distance in a state of being trapped inside the core. Since the ratio of the maximum value of the concentration of the alkali metal element or the like in the cladding to the maximum value of the concentration of the alkali metal element or the like in the core is 0.06 or higher and 0.25 or lower, a transmission loss can be reduced.

In one embodiment, an exponent α in an approximation curve $c(1-(r/a)^\alpha)$ of a concentration of the dopant at a radial direction position r from a central axis of the core may be 0.1 or higher and 1 or lower, where c denotes a maximum value of the concentration of the dopant, and a denotes a doping diameter of the dopant. In this case, the transmission loss can be further reduced.

In the present disclosure, a tensile stress that is a stress remaining in the optical fiber and operates in a direction orthogonal to a plane in a cross-section orthogonal to a longitudinal direction is indicated by a positive value, and a compressive stress is indicated by a negative value. In one embodiment, a maximum value of a residual stress in the core minus a minimum value of a residual stress in the cladding may be 10 MPa or lower. In this case, the transmission loss can be further reduced.

In one embodiment, a maximum value of a fictive temperature in the core and the cladding minus a minimum value of the fictive temperature in the core and the cladding may be 50° C. or lower. In this case, the transmission loss can be particularly reduced.

In one embodiment, a maximum value of $\log_{10}\eta$ at 1500° C. minus a minimum value of $\log_{10}\eta$ at 1500° C. may be 2 or lower as given a viscosity of the core and the cladding being set as η. In this case, a fictive temperature difference can be suppressed to 50° C. or lower. For example, the viscosity η is noted as unit Poise (=0.1×Pa·s=0.1 kg/m·s). In the present disclosure, only the "difference in logarithm of viscosity" becomes a problem, and thus an arbitrary unit may be noted as long as the same unit is noted.

In the present disclosure, "concentration" is noted as "mass fraction" (a ratio of the mass of each component to the total mass). In one embodiment, a concentration of halogen in the cladding may be higher than a concentration of halogen in the core. In this case, the viscosity of the core and the cladding can be made uniform.

In one embodiment, the concentration of halogen in the core may be 100 ppm or higher and 3700 ppm or lower, and the concentration of halogen in the cladding may be 7000 ppm or higher and 11000 ppm or lower. In this case, the viscosity of the core and the cladding can be reliably made uniform.

In one embodiment, the core may be formed from silica glass in which a maximum value of the concentration of the dopant is 10 ppm or higher, a concentration of chlorine is 100 ppm or higher and 2000 ppm or lower, and a concentration of fluorine is 1000 ppm or higher and 3500 ppm or lower, and the cladding may be formed from silica glass in which the concentration of chlorine is 100 ppm or higher and 1000 ppm or lower, and the concentration of fluorine is 7000 ppm or higher and 10000 ppm or lower. In this case, the viscosity of the core and the cladding can be reliably made uniform.

In one embodiment, the maximum value of the concentration of the dopant in the core may be 200 ppm or lower. In this case, an increase in the transmission loss having a peak at 630 nm due to glass defects can be suppressed.

In one embodiment, the transmission loss may be 0.153 dB/km or lower.

Details of Embodiment of Present Disclosure

Hereinafter, an embodiment for carrying out the present disclosure will be described in detail with reference to the accompanying drawings. In description of the drawings, the same reference numeral will be given to the same element, and redundant description thereof will be omitted. The present invention is not limited to the following examples and is indicated by the appended claims, and meanings equivalent to the appended claims and all modifications within the scope of the appended claims are intended to be included to the invention.

In the optical fiber, in order for light to propagate over a long distance while being trapped inside the core, it is necessary to set a difference between a relative refractive index of the core and a relative refractive index of the cladding (relative refractive index difference between the core and the cladding) Δ to 0.2% or higher. Here, the relative refractive index difference Δ between the core and the cladding is expressed by Expression (1):

$$\Delta[\%]=100\times(n_1^2-n_2^2)/2n_0^2, \quad (1)$$

where $n_0$ denotes a refractive index of silica glass that does not contain a dopant, $n_1$ denotes a refractive index of the core, and $n_2$ denotes a refractive index of the cladding.

Note that, a relative refractive index of glass having a refractive index $n_1$ is defined by Expression (2).

$$\text{Relative refractive index }[\%]=100\times(n_1^2-n_0^2)/2n_0^2 \quad (2)$$

A dopant such as germanium (Ge) that increases the refractive index may be added to glass that constitutes a core part of an optical fiber preform so as to set the relative refractive index difference Δ between the core and the cladding to 0.2% or higher. In a case where the dopant is not added to the glass that constitutes the core part, a dopant such as fluorine that decreases the refractive index is typically added to the glass that constitutes a cladding part.

Since fluorine substantially does not diffuse in the glass, in the case of adding fluorine to the glass that constitutes the cladding part, fluorine remains in the cladding part. According to this, a concentration of fluorine rapidly varies at an interface between the core part and the cladding part, and the amount of variation in the concentration of fluorine (value obtained by differentiating the concentration of fluorine in a radial direction) becomes maximum. According to this, the amount of variation in the relative refractive index (value obtained by differentiating the relative refractive index in the radial direction) also becomes maximum at the interface between the core part and the cladding part. Since fluorine decreases the viscosity of glass, in a case where the concentration of fluorine rapidly varies at the interface between the core part and the cladding part, strain occurs at the interface between the core and the cladding due to the viscosity difference between the core part and the cladding part.

In the core through which light (signal light) propagates and at the vicinity of the core, in an optical fiber in which a strain loss (transmission loss) caused by the strain of the interface between the core and the cladding occurs, a relative absorption loss having a peak in the vicinity of a wavelength of 600 nm occurs. For example, in a wavelength of 630 nm, the transmission loss increases due to a glass defect called non-bridging oxygen hole center (NBOHC). In Patent Literature 1 described above, in order to suppress the increase in the transmission loss, a method of adding an alkali metal element to the core has been examined. After optical fiber glass of which viscosity is reduced due to addition of the alkali metal element is stretched (drawn) to a diameter of 125 μm, when the optical fiber is reheated at an appropriate temperature, structure relaxation of the glass progresses. According to this, it is considered that the structure of glass molecules becomes uniform, and the transmission loss due to fluctuation of the density of the glass molecules is reduced.

Light propagating through the optical fiber spreads to not only the core but also the cladding. Accordingly, in order to reduce the transmission loss in the optical fiber, it is important to reduce the transmission loss by causing the structure relaxation of the glass to progress in not only the core but also the cladding. For this, it is considered that it is necessary to appropriately control a concentration distribution of the alkali metal element in the core and the cladding. However, the alkali metal element diffuses over a distance that is approximately the half of the diameter of the optical fiber due to heat applied in a process of manufacturing the optical fiber. Accordingly, a concentration distribution in an optical fiber preform state alone is not sufficient for optimization of the concentration distribution of the alkali metal element.

Patent Literature 2 described above discloses that since the alkali metal element added to the core diffuses to the cladding, an average concentration of the alkali metal element in the core of the optical fiber decreases to 1/100 times or lower the average concentration in the optical fiber preform state.

FIG. 1 is a view illustrating a cross-section of an optical fiber, a refractive index distribution, and a concentration distribution of an alkali metal element or the like according to the embodiment. As illustrated in FIG. 1, an optical fiber 1 according to this embodiment includes a core 11 and a cladding 12 that surrounds the core 11. A refractive index of the core 11 is higher than a refractive index of the cladding 12. A relative refractive index difference Δ between the core 11 and the cladding 12 is 0.2% or higher. In the optical fiber 1, since the relative refractive index difference Δ is 0.2% or higher, light is allowed to propagate over a long distance in a state of being trapped inside the core 11.

The core 11 and the cladding 12 are formed from silica glass containing an alkali metal element or the like. For example, the alkali metal element includes at least one or more among sodium (Na), potassium (K), cesium (Ce), rubidium (Rb), barium (Ba), magnesium (Mg), and calcium (Ca). In this embodiment, the alkali metal element or the like is substantially composed of potassium.

A ratio of a maximum value of a concentration of the alkali metal element or the like in the cladding 12 to a maximum value of a concentration of the alkali metal element or the like in the core 11 (hereinafter, referred to as "concentration ratio of the alkali metal element or the like") is 0.06 or higher and 0.25 or lower. An example of a potassium (K) concentration distribution in a radial direction as illustrated in FIG. 1 is measured by SIMS. For example, the optical fiber 1 is manufactured by using an optical fiber preform in which the alkali metal element or the like is added to only the core part. The alkali metal element or the like added to the core part diffuses to the cladding part due to heat in a manufacturing process, and shows a concentration distribution as illustrated in FIG. 1.

Figure 2:
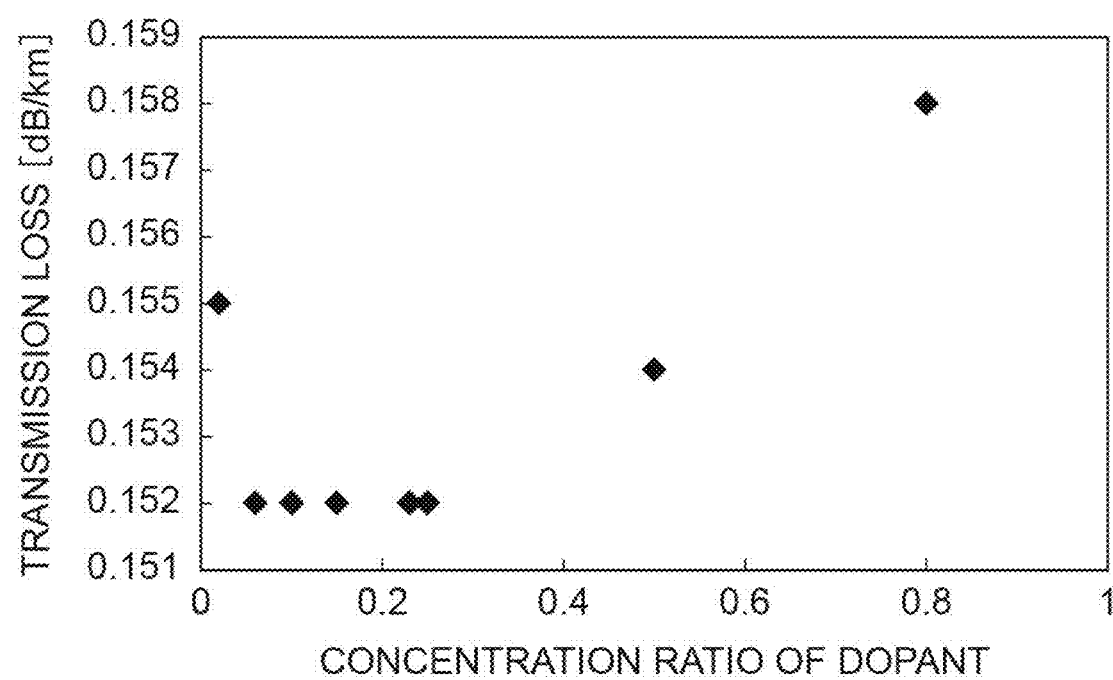
FIG. 2 is a graph showing a relationship between a ratio of a maximum value of a concentration of a dopant composed of an alkali metal element or an alkaline-earth metal element in a cladding to a maximum value of a concentration of a dopant composed of an alkali metal element or an alkaline-earth metal element in a core, and a transmission loss.

FIG. 2 is a graph showing a relationship between the ratio of the maximum value of the concentration of the alkali metal element or the like in the cladding to the maximum value of the concentration of the alkali metal element or the like in the core, and a transmission loss. In FIG. 2, the horizontal axis represents the concentration ratio of the alkali metal element or the like, and the vertical axis represents the transmission loss in the optical fiber 1. The relationship between the concentration ratio of the alkali metal element or the like and the transmission loss is also shown in Table 1.

TABLE 1

| Concentration ratio of dopant | Transmission loss [dB/km] |
| --- | --- |
| 0.02 | 0.155 |
| 0.06 | 0.152 |
| 0.1 | 0.152 |
| 0.15 | 0.152 |
| 0.23 | 0.152 |
| 0.25 | 0.152 |
| 0.5 | 0.154 |
| 0.8 | 0.158 |

As shown in FIG. 2 and Table 1, in a range where the concentration ratio of the alkali metal element or the like is 0.06 or higher and 0.25 or lower, the transmission loss is low. In a range where the concentration ratio of the alkali metal element or the like is lower than 0.06, and a range where the concentration ratio of the alkali metal element or the like exceeds 0.25, the transmission loss rapidly deteriorates. In a range where the concentration ratio of the alkali metal element or the like is lower than 0.06, the alkali metal element or the like does not sufficiently diffuse to the cladding part of the optical fiber preform, and the viscosity of the cladding part and an outer peripheral portion of the core part cannot be sufficiently lowered. Accordingly, it is considered that the molecular structure of glass is not uniform and the transmission loss cannot be reduced. On the other hand, in a range where the concentration ratio of the alkali metal element or the like exceeds 0.25, the alkali metal element or the like excessively diffuses to the cladding part, and thus the viscosity of the cladding part greatly lowers in comparison to the viscosity of the core part. According to this, it is considered that a stress strain of the core 11 relatively increases, and the transmission loss deteriorates.

Figure 3:
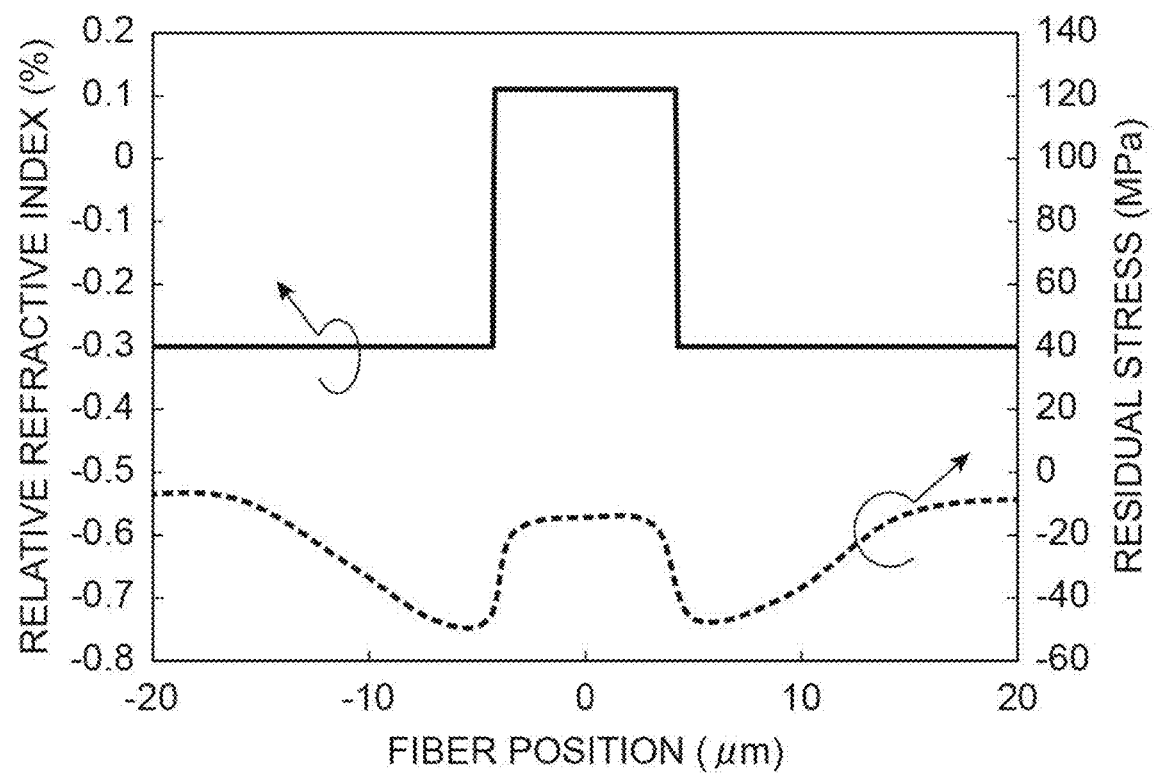
FIG. 3 is a graph showing a relative refractive index distribution and a residual stress distribution when a concentration ratio of a dopant composed of an alkali metal element or an alkaline-earth metal element is 0.8.
Figure 4:
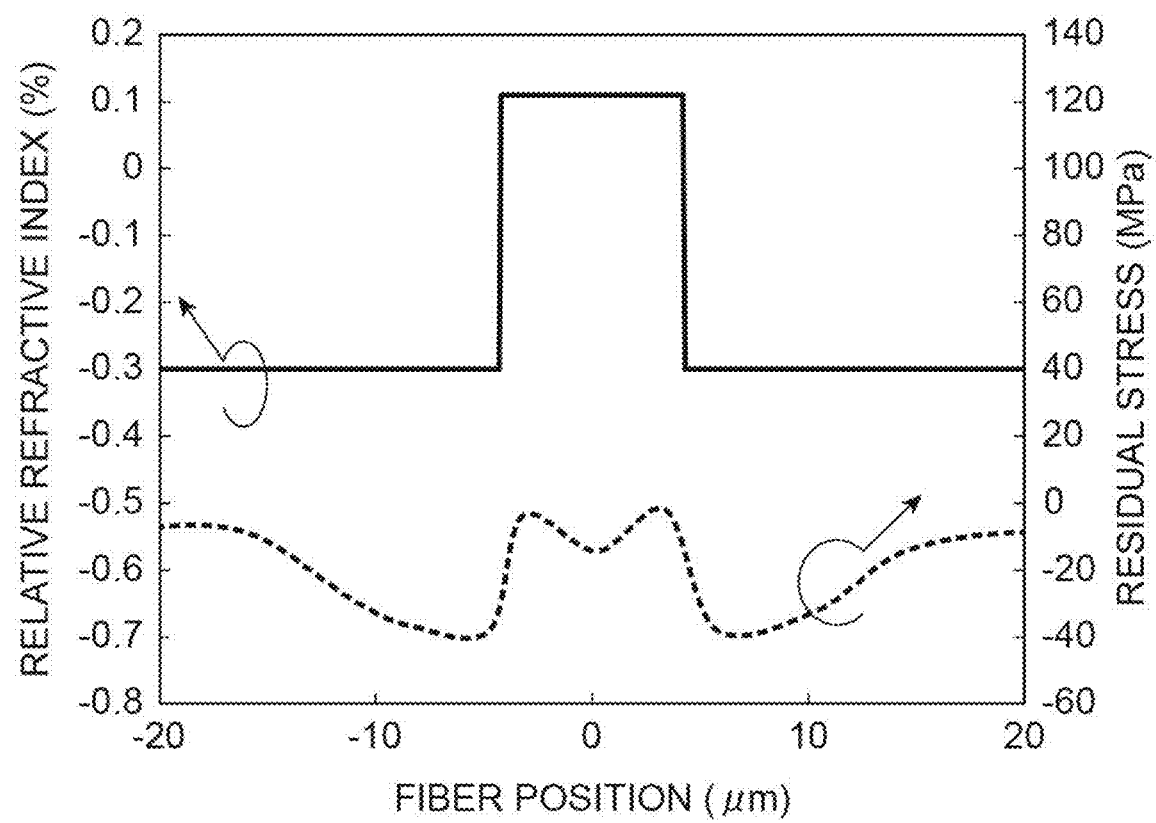
FIG. 4 is a graph showing the relative refractive index distribution and the residual stress distribution when the concentration ratio of the dopant composed of an alkali metal element or an alkaline-earth metal element is 0.02.

FIG. 3 is a graph showing a relative refractive index distribution and a residual stress distribution when the concentration ratio of the alkali metal element or the like is 0.8. FIG. 4 is a graph showing the relative refractive index distribution and the residual stress distribution when a concentration ratio of the alkali metal element or the like is 0.02. In FIG. 3 and FIG. 4, the horizontal axis represents a radial direction position (fiber position) of the optical fiber 1, the left vertical axis represents the relative refractive index, and the right vertical axis represents the residual stress.

According to the residual stress distribution shown in FIG. 3, it can be seen that a stress strain of the core 11 increases in a range where the concentration ratio of the alkali metal element or the like exceeds 0.25. According to the residual stress distribution shown in FIG. 4, it can be seen that a portion with high residual stress exists in an outer peripheral portion of the core 11 in a range where the concentration ratio of the alkali metal element or the like is lower than 0.06. The reason for this is considered because the concentration of the alkali metal element or the like in the vicinity of an interface between the core part and the cladding part is small. In the case of FIG. 4, it is expected that the transmission loss to the stress strain in the outer peripheral portion of the core 11 occurs.

The concentration distribution of the alkali metal element or the like when a maximum value (peak concentration) is set as c and a doping diameter is set as a is approximated as a function of a radial direction position r from the central axis of the core 11 by using the following Expression (3):

$$\text{Concentration}(r) \text{ of the alkali metal element or the like} = c(1-(r/a)^\alpha) \quad (3)$$

Here, the doping diameter of the alkali metal element or the like represents a distance from a central position of a region containing the alkali metal element or the like to a position that substantially does not contain the alkali metal element or the like. Here, the central position of the region containing the alkali metal element or the like is the central axis of the core 11. For example, the doping diameter of the alkali metal element or the like is a distance up to a position where the concentration of the alkali metal element or the like becomes 1/10 or lower of the peak concentration. In the optical fiber 1, an exponent $\alpha$ in Expression (3) described above is 0.1 or higher and 1 or lower.

Figure 5:
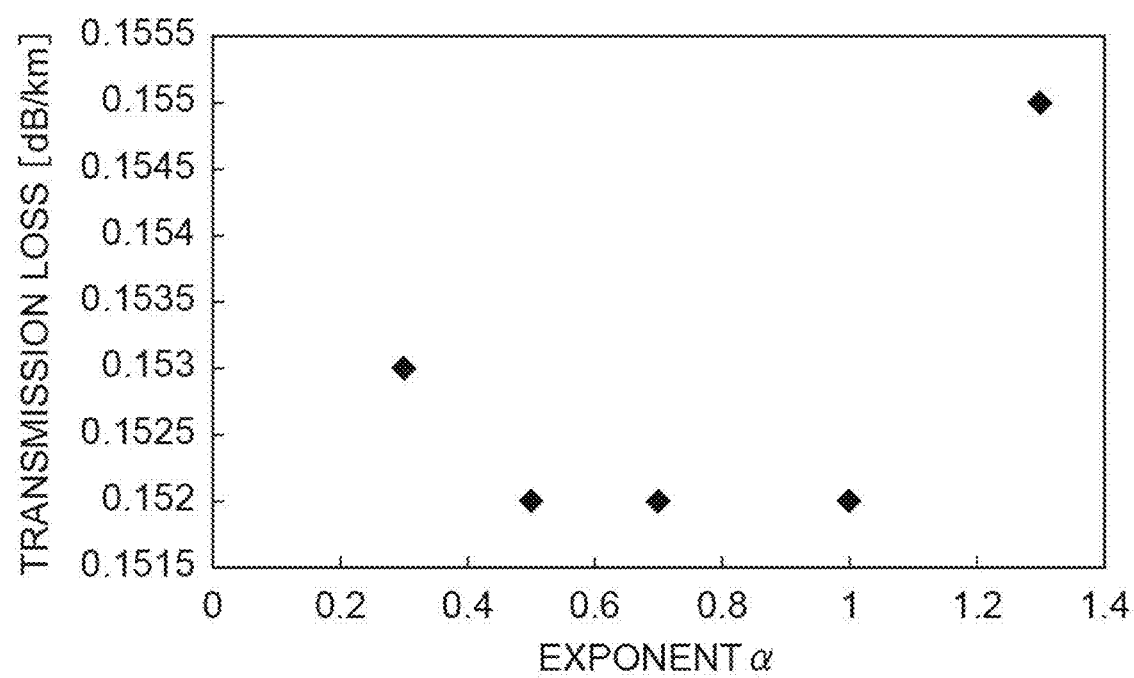
FIG. 5 is a graph showing a relationship between an exponent $\alpha$ and a transmission loss.

FIG. 5 is a graph showing a relationship between the exponent $\alpha$ and the transmission loss. In FIG. 5, the horizontal axis represents the exponent a and the vertical axis represents the transmission loss. The relationship between the exponent $\alpha$ and the transmission loss is also shown in Table 2.

TABLE 2

| Exponent $\alpha$ | Transmission loss [dB/km] |
|---|---|
| 1.3 | 0.155 |
| 1 | 0.152 |
| 0.7 | 0.152 |
| 0.5 | 0.152 |
| 0.3 | 0.153 |

In the optical fiber 1, a difference between a maximum value of the residual stress in the core 11 and a minimum value of the residual stress in the cladding 12 (hereinafter, referred to as "residual stress difference") is 10 MPa or lower. That is, the maximum value of the residual stress in the core 11 minus the minimum value of the residual stress in the cladding 12 is 10 MPa or lower. In the case of adding fluorine to the glass that constitutes the cladding part so as to adjust the relative refractive index difference $\Delta$ between the core 11 and the cladding 12, the viscosity rapidly varies between the core part and the cladding part. According to this, in a case where a stress occurs, deterioration in the transmission loss due to the stress strain is likely to occur.

Figure 6:
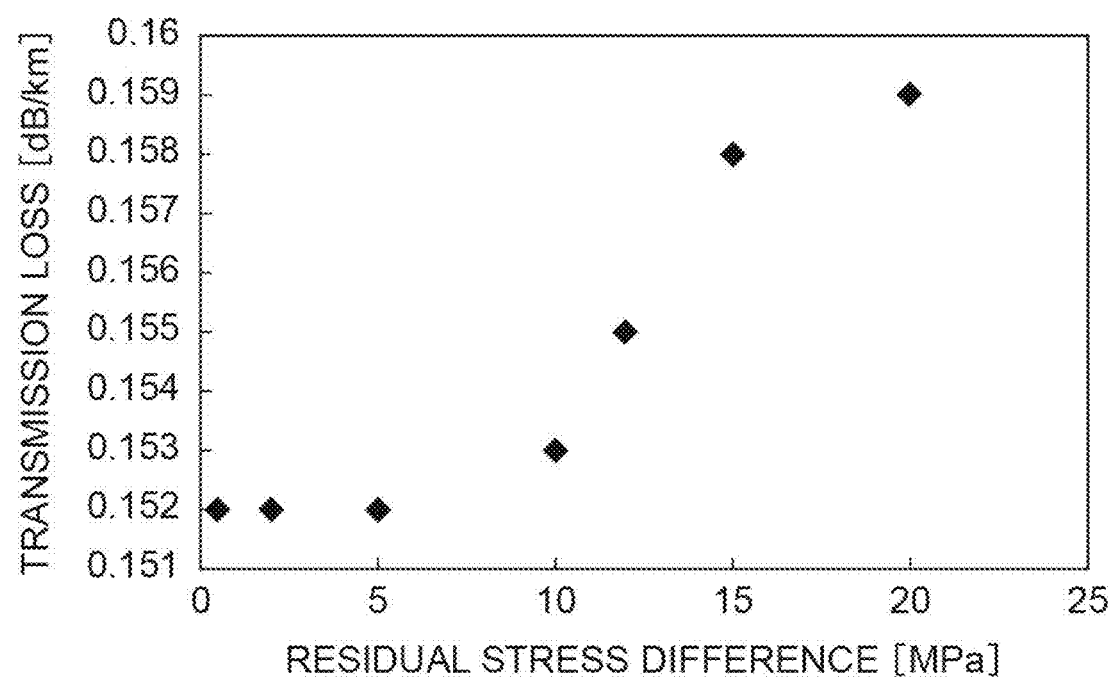
FIG. 6 is a graph showing a relationship between a residual stress difference and the transmission loss.

FIG. 6 is a graph showing a relationship between a residual stress difference and the transmission loss. In FIG. 6, the horizontal axis represents the residual stress difference and the vertical axis represents the transmission loss. The relationship between the residual stress difference and the transmission loss is also shown in Table 3. As shown in FIG. 6 and Table 3, when the residual stress difference is 10 MPa or lower, the transmission loss can be reduced.

TABLE 3

| Residual stress difference [MPa] | Transmission loss [dB/km] |
|---|---|
| 0.5 | 0.152 |
| 2 | 0.152 |

TABLE 3-continued

| Residual stress difference [MPa] | Transmission loss [dB/km] |
|---|---|
| 5 | 0.152 |
| 10 | 0.153 |
| 12 | 0.155 |
| 15 | 0.158 |
| 20 | 0.159 |

In the optical fiber 1, a difference between a maximum value and a minimum value of a fictive temperature in the core 11 and the cladding 12 (hereinafter, referred to as "fictive temperature difference") is 50° C. or lower. That is, the maximum value minus the minimum value of the fictive temperature in the core 11 and the cladding 12 is 50° C. or lower. The fictive temperature can be used as an index indicating a state in which the molecular structure of the glass is made uniform due to structure relaxation of the glass. It can be said that glass of which the fictive temperature is low is glass with low transmission loss. In a case where the concentration ratio of the alkali metal element or the like is 0.06 or higher and 0.25 or lower, and the fictive temperature difference is as flat as 50° C. or lower, the transmission loss can be particularly reduced.

A halogen element contained in the core 11 and the cladding 12 may have a concentration distribution in a radial direction of the optical fiber 1. A situation in which the fictive temperature difference of the optical fiber 1 is 50° C. or lower represents that a viscosity reduction effect due to a concentration distribution of the halogen element and a viscosity reduction effect due to a concentration distribution of the diffused alkali metal element or the like are combined, and the viscosity in the radial direction in a range from the core 11 to the cladding 12 is approximately uniform. In this case, it is considered that a local stress strain does not occur in a range from the core 11 to the cladding 12, and thus deterioration in the transmission loss does not occur.

Figure 7:
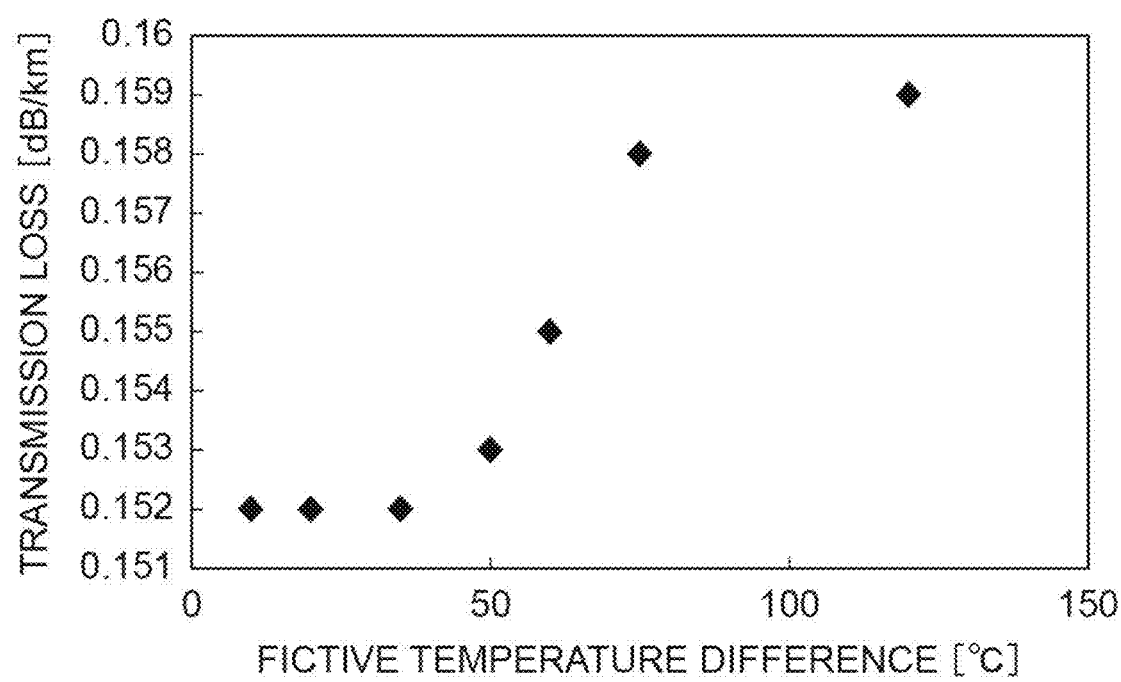
FIG. 7 is a graph showing a relationship between a fictive temperature difference and the transmission loss.

FIG. 7 is a graph showing a relationship between the fictive temperature difference and the transmission loss. In FIG. 7, the horizontal axis represents the fictive temperature difference and the vertical axis represents the transmission loss. The relationship between the fictive temperature difference and the transmission loss is also shown in Table 4.

TABLE 4

| Fictive temperature difference [° C.] | Transmission loss [dB/km] |
|---|---|
| 10 | 0.152 |
| 20 | 0.152 |
| 35 | 0.152 |
| 50 | 0.153 |
| 60 | 0.155 |
| 75 | 0.158 |
| 120 | 0.159 |

As shown in FIG. 7 and Table 4, in a case where the fictive temperature difference exceeds 50° C., the transmission loss rapidly deteriorates. In the core 11 and the cladding 12, even if a portion in which the fictive temperature difference exceeds 50° C., that is, a portion in which the viscosity is higher in comparison to the periphery exists partially, the transmission loss rapidly deteriorates.

In the optical fiber 1, when the viscosity of the core 11 and the cladding 12 is set as $\eta$, a maximum value of $\log_{10}\eta$ minus a minimum value of $\log_{10}\eta$ is 2 or lower. As described above, in the core 11 and the cladding 12, even if a portion in which the viscosity is higher in comparison to the periphery exists partially, a stress strain locally occurs, and the transmission loss deteriorates.

Figure 8:
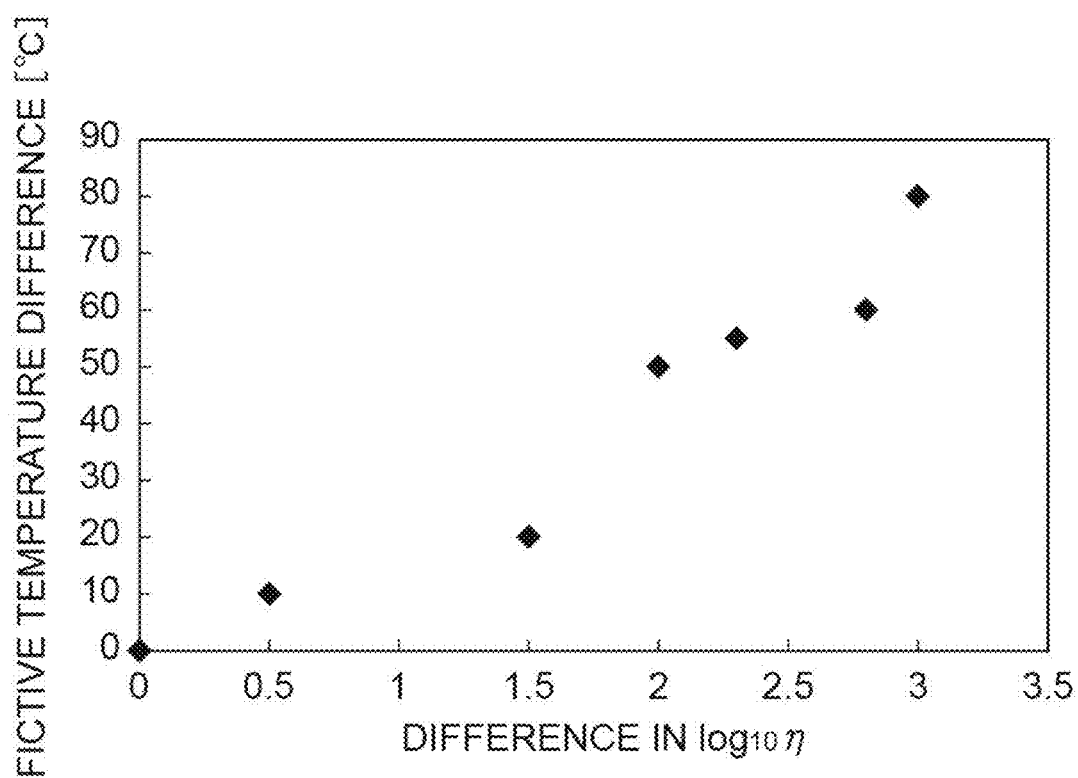
FIG. 8 is a graph showing a relationship between a difference in logarithm of viscosity before and after heating and rapid cooling of glass and the fictive temperature difference.

FIG. 8 is a graph showing a relationship between a difference in logarithm of viscosity before and after heating and rapid cooling of glass and the fictive temperature difference. In FIG. 8, the horizontal axis represents a difference in $\log_{10}\eta$ as a difference in logarithm of viscosity before and after heating and rapid cooling of glass, and the vertical axis represents the fictive temperature difference before and after heating and rapid cooling of the glass. Here, the glass was rapidly cooled after being heated to 1500° C. According to FIG. 8, it is considered that when the maximum value minus the minimum value of $\log_{10}\eta$ at 1500° C. is set to 2 or lower, the fictive temperature difference can be suppressed to 50° C. or lower.

In a drawing process, it is considered that cooling progresses from an outer side of the glass, and a cooling rate in the radial direction is different. The faster the cooling rate is, the higher the fictive temperature becomes, and thus in the optical fiber 1, the fictive temperature in the cladding part on an outer side tends to be high. Accordingly, even in a case where the cladding part is constituted by glass which contains fluorine and of which viscosity is low, and a difference exists between the viscosity of the core part and the viscosity of the cladding part, it is assumed that the fictive temperature in the cladding 12 can be raised by adjusting the cooling rate, and can be made to be closer to the fictive temperature in the core 11. However, when be rapidly cooled, the fictive temperature of the entirety of the optical fiber 1 is raised. Accordingly, it is considered that the transmission loss can be further reduced when being slowly cooled in a state in which the viscosity of the core 11 and the viscosity of the cladding 12 match each other.

In the optical fiber 1, for example, the core 11 is constituted by glass that contains silica as a main component. The glass contains alkali metal element or the like, chlorine, and fluorine, and substantially does not contain the other elements. For example, the maximum value of the concentration of the alkali metal element or the like is 10 ppm or higher and 200 ppm or lower. When the maximum value of the concentration of the alkali metal element or the like is lower than 10 ppm, there is no difference from an optical fiber to which the alkali metal element or the like is not added in the fictive temperature and the transmission loss, and an effect of promoting structure relaxation by the addition is small. When the maximum value of the concentration of the alkali metal element or the like exceeds 200 ppm, the loss having a peak at 630 nm due to glass defects increases. For example, a concentration of chlorine is 100 ppm or higher and 2000 ppm or lower. For example, a concentration of fluorine is 1000 ppm or higher and 3500 ppm or lower. For example, a concentration of halogen that is the sum of the concentration of chlorine and the concentration of the fluorine is 100 ppm or higher and 3700 ppm or lower.

For example, the cladding 12 is constituted by glass that contains silica as a main component. The glass contains alkali metal element or the like, chlorine, and fluorine, and substantially does not contain the other elements. For example, the maximum value of the concentration of the alkali metal element or the like is 6 ppm or higher and 25 ppm or lower. For example, a concentration of chlorine is 100 ppm or higher and 1000 ppm or lower. For example, a concentration of fluorine is 7000 ppm or higher and 10000 ppm or lower. For example, a concentration of halogen that is the sum of the concentration of chlorine and the concentration of the fluorine is 7000 ppm or higher and 11000 ppm or lower. The concentration of halogen in the cladding 12 is higher than the concentration of halogen in the core 11.

The viscosity of the core part and the cladding part is lowered by the alkali metal element or the like that is added, and is lowered also by halogen that is added to adjust the relative refractive index. Halogen that is typically used in manufacturing of the optical fiber is chlorine and fluorine. The refractive index and the viscosity can be independently changed in an arbitrary manner by a combination of chlorine and fluorine. In the case of adding the alkali metal element or the like to the core part, the viscosity of the core part is lowered. Accordingly, it is necessary to set the concentration of halogen added to the cladding part to be higher than the concentration of halogen added to the core so as to make the viscosity in the radial direction of the fiber uniform.

Next, description will be given of an example of a method for manufacturing the optical fiber according to this embodiment. In the method for manufacturing the optical fiber according to this embodiment, the optical fiber is manufactured in the order of a preparation process, rod-in collapse process, a VAD process, and a drawing process. Note that, an example of manufacturing conditions will be described in the following description, but there is no limitation thereto.

In the preparation process, a core rod that contains an alkali metal element or the like, chlorine (Cl), and fluorine, and has an outer diameter of 26 mm is prepared. A doping diameter of the alkali metal element or the like is 6 mm, and a peak concentration of the alkali metal element or the like is 1000 ppm. A concentration of chlorine is 100 ppm. A concentration of fluorine is 3000 ppm. For example, the core rod can be manufactured by methods described in Japanese Unexamined Patent Publication No. 2005-537210 and specification of US Unexamined Patent Publication No. 2006/0130530. The methods described in Japanese Unexamined Patent Publication No. 2005-537210 and specification of US Unexamined Patent Publication No. 2006/0130530 are incorporated herein by reference.

A doping diameter of the alkali metal element or the like in a fiber state was adjusted as follows. That is, heating time in a process of adding the alkali metal element or the like was appropriately controlled, and a concentration distribution of the alkali metal element or the like in a core rod state was measured and was compared with a concentration distribution of the alkali metal element or the like after fiberization. The comparison result was fed back to heating conditions to adjust the heating conditions for obtaining a desired concentration distribution of the alkali metal element or the like.

As a method of adjusting the addition conditions of the alkali metal element or the like, in addition to the above-described method, a method of widening a pipe inner diameter, a method of etching a pipe inner surface to which the alkali metal element or the like was added by a known method such as vapor phase etching, a method of heating a pipe or a rod glass body to which the alkali metal element or the like is added, and of diffusing the alkali metal element or the like to make the concentration distribution of the alkali metal element or the like wide and gentle, and the like are considered. In any method, the concentration distribution of the alkali metal element or the like in the fiber state is adjusted to a desired shape.

The alkali metal element or the like that is added is any one or more of sodium (Na), potassium (K), cesium (Ce), rubidium (Rb), barium (Ba), magnesium (Mg), and calcium (Ca). A diffusion rate of the alkali metal element or the like is different for every element. For example, a diffusion coefficient of Na is 10 times a diffusion coefficient of K, a diffusion coefficient of Rb is 0.6 times the diffusion coefficient of K, a diffusion coefficient of Cs is 0.4 times the diffusion coefficient of K, and a diffusion coefficient of Ca is 0.2 times the diffusion coefficient of K. Accordingly, in order for the ratio of the maximum value of the concentration of the alkali metal element or the like in the cladding to the maximum value of the concentration of the alkali metal element or the like in the core of the optical fiber to be a desired value, it is necessary to select an element in consideration of the diffusion coefficient, or it is necessary to adjust the doping diameter of the alkali metal element or the like in the optical fiber preform. A diffusion distance is proportional to the square root of the diffusion coefficient. Accordingly, in the optical fiber preform, for example, when a doping diameter in the case of Cs is set to $\sqrt{(1/0.4)} \approx 1.6$ times a doping diameter in the case of K, the ratio of the maximum value of the concentration of the alkali metal element or the like in the cladding to the maximum value of the concentration of the alkali metal element or the like in the core of the optical fiber becomes the same in each of K and Cs. Accordingly, the residual stress in the core which is measured in a fiber state can be reduced to the same extent for K and Cs. According to this, even in the case of Cs, a stress difference between the core and the cladding can be set to 10 MPa or lower. With regard to the other elements, similarly, an optimal doping diameter is obtained from the diffusion coefficient, and the same effect as in K can be obtained by adjusting the doping diameter of a dopant.

In addition, the doping diameter can also be adjusted so that the ratio of the maximum value of the concentration of the alkali metal element or the like in the cladding to the maximum value of the concentration of the alkali metal element or the like in the core of the optical fiber becomes 0.06 or higher and 0.25 or lower by combining elements different in the diffusion rate. Even in this case, an initial addition state is adjusted so that a concentration ratio of the alkali metal element or the like that is added in a fiber preform state, and a concentration distribution of the alkali metal element or the like after fiberization becomes a desired concentration ratio and a desired concentration distribution. Specifically, a core rod that is obtained is stretched and ground to adjust a ratio of the doping diameter of the alkali metal element or the like to an outer diameter of the core rod becomes 3 times or higher and 4 times or lower. According to this, the concentration ratio of the alkali metal element or the like after fiberization can be set to 0.15.

In the rod-in collapse process, a cladding part is provided on an outer side of a core part constituted by a core rod. At this time, a rod-in collapse method is used. In the rod-in collapse method, the core rod is inserted to the inside of a quartz-based glass pipe (a first cladding part) to which fluorine is added, and both the quartz-based glass pipe and the core rod are heated and integrated by an external heat source. A relative refractive index difference between the core part and the first cladding part is approximately 0.27% to the maximum. As a result of the composition by the rod-in collapse method, the amount of water in the core part and the cladding part in the vicinity of the core part can be suppressed to be sufficiently low. A concentration of chlorine contained in the pipe was 300 ppm, and a concentration of fluorine contained in the pipe was 10000 ppm.

In the VAD process, after the rod in which the core part and the cladding part are integrated with each other is stretched to a predetermined diameter, a second cladding part containing fluorine may be composed of an outer side of the rod by a VAD method. According to this, the optical fiber preform is manufactured.

In the subsequent drawing process, the optical fiber preform manufactured by the method for manufacturing the optical fiber preform described above is drawn to manufacture the optical fiber 1. A drawing rate is 1000 m/min, and a drawing tensile force is 0.5 N. In a case where the fiber is rapidly cooled in the drawing process, the cladding 12 is cooled early due to a difference in a cooling rate in a radial direction. According to this, a residual stress difference occurs between the core 11 and the cladding 12. An annealing furnace is provided under a drawing furnace, and the fiber is reheated and is gradually cooled to reduce the residual stress difference. For example, a cooling rate in a temperature region of 1700° C. to 1000° C. in which the fictive temperature is determined is set to 2300° C./s or lower.

REFERENCE SIGNS LIST

1: optical fiber, 11: core, 12: cladding.

The invention claimed is:

1. An optical fiber comprising:
a core; and
a cladding that surrounds the core,
wherein the core and cladding are respectively formed from silica glass containing a dopant composed of an alkali metal element or an alkaline-earth metal element,
a relative refractive index difference $\Delta$ defined by Expression (1):

$$\Delta[\%] = 100 \times (n_1^2 - n_2^2)/2n_0^2 \qquad (1)$$

is 0.2% or higher, where $n_0$ denotes a refractive index of silica glass that does not contain the dopant, $n_1$ denotes a refractive index of the core, and $n_2$ denotes a refractive index of the cladding, and
a ratio of a maximum value of a concentration of the alkali metal element or the alkaline-earth metal element in the cladding to a maximum value of a concentration of the alkali metal element or the alkaline-earth metal element in the core is 0.06 or higher and 0.25 or lower.

2. The optical fiber according to claim 1,
wherein an exponent $\alpha$ in an approximation curve $c(1-(r/a)^\alpha)$ of a concentration of the dopant at a radial direction position r from a central axis of the core is 0.1 or higher and 1 or lower where c denotes a maximum value of the concentration of the dopant, and a denotes a doping diameter of the dopant.

3. The optical fiber according to claim 1,
where a maximum value of a residual stress in the core minus a minimum value of a residual stress in the cladding is 10 MPa or lower.

4. The optical fiber according to claim 1,
wherein a concentration of halogen in the cladding is higher than a concentration of halogen in the core.

5. The optical fiber according to claim 4,
wherein the concentration of halogen in the core is 100 ppm or higher and 3700 ppm or lower, and
the concentration of halogen in the cladding is 7000 ppm or higher and 11000 ppm or lower.

6. The optical fiber according to claim 4,
wherein the core is formed from silica glass in which a maximum value of the concentration of the dopant is 10 ppm or higher, a concentration of chlorine is 100 ppm or higher and 2000 ppm or lower, and a concentration of fluorine is 1000 ppm or higher and 3500 ppm or lower, and
the cladding is formed from silica glass in which the concentration of chlorine is 100 ppm or higher and 1000 ppm or lower, and the concentration of fluorine is 7000 ppm or higher and 10000 ppm or lower.

7. The optical fiber according to claim 6,
wherein the maximum value of the concentration of the dopant in the core is 200 ppm or lower.

8. The optical fiber according to claim 1,
wherein the optical fiber has a transmission loss of 0.153 dB/km or lower.

* * * * *